United States Patent
Liao et al.

(10) Patent No.: US 11,859,083 B2
(45) Date of Patent: Jan. 2, 2024

(54) LOW-DIELECTRIC RUBBER RESIN MATERIAL AND LOW-DIELECTRIC METAL SUBSTRATE

(71) Applicant: NAN YA PLASTICS CORPORATION, Taipei (TW)

(72) Inventors: Te-Chao Liao, Taipei (TW); Hung-Yi Chang, Taipei (TW); Chia-Lin Liu, Taipei (TW); Chien-Kai Wei, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/740,301

(22) Filed: May 9, 2022

(65) Prior Publication Data
US 2023/0046004 A1 Feb. 16, 2023

(30) Foreign Application Priority Data

Aug. 2, 2021 (TW) .................. 110128258

(51) Int. Cl.
| | |
|---|---|
| *C08L 71/12* | (2006.01) |
| *B32B 15/06* | (2006.01) |
| *B32B 15/08* | (2006.01) |
| *C08L 9/06* | (2006.01) |

(52) U.S. Cl.
CPC ............ *C08L 71/126* (2013.01); *B32B 15/06* (2013.01); *B32B 15/08* (2013.01); *C08L 9/06* (2013.01); *B32B 2260/021* (2013.01); *B32B 2260/046* (2013.01); *B32B 2262/101* (2013.01); *B32B 2264/1021* (2020.08); *B32B 2305/076* (2013.01); *B32B 2307/204* (2013.01); *B32B 2457/04* (2013.01); *C08L 2203/20* (2013.01); *C08L 2205/03* (2013.01); *C08L 2205/05* (2013.01); *C08L 2207/324* (2013.01); *C08L 2312/00* (2013.01); *C08L 2666/72* (2013.01)

(58) Field of Classification Search
CPC . C23C 14/20; C08G 73/10; C08L 9/06; C08L 2203/20; C08L 2666/72; C08L 79/085; C08L 71/126; C08L 2205/03; C08L 2205/05; C08L 2207/324; C08L 2312/00; C08L 7/085; C08F 236/08; B32B 15/06; B32B 15/08; B32B 2260/021; B32B 2260/046; B32B 2262/101; B32B 2264/1021; B32B 2305/076; B32B 2307/204; B32B 2457/04
See application file for complete search history.

(56) References Cited

U.S. PATENT DOCUMENTS

| | | | |
|---|---|---|---|
| 10,023,707 B2 | 7/2018 | Liao et al. | |
| 2021/0355259 A1 | 11/2021 | Liu et al. | |
| 2021/0371666 A1* | 12/2021 | Shiobara | ................ C08L 63/00 |

FOREIGN PATENT DOCUMENTS

| | | | |
|---|---|---|---|
| CN | 103965606 A | * | 8/2014 |
| CN | 111363308 A | | 7/2020 |
| CN | 113004676 A | | 6/2021 |
| JP | 58164638 A | | 9/1983 |
| TW | 201623440 A | | 7/2016 |
| TW | 202003689 A | | 1/2020 |
| TW | I725851 B | | 4/2021 |
| TW | 202122490 A | | 6/2021 |
| WO | WO2020096036 A1 | | 5/2020 |

OTHER PUBLICATIONS

"Liquid Polybutadiene Resins" Cray Valley. https://crayvalley.com/products/liquid-polybutadienes/ Accessed Jun. 1, 2023. (Year: 2023).*

* cited by examiner

*Primary Examiner* — John D Freeman
(74) *Attorney, Agent, or Firm* — Li & Cai Intellectual Property Office

(57) ABSTRACT

A low-dielectric rubber resin material and a low-dielectric metal substrate are provided. The rubber resin material includes a low-dielectric rubber resin composition and inorganic fillers. The low-dielectric rubber resin composition includes: 5 wt % to 40 wt % of a liquid rubber, 20 wt % to 70 wt % of a polyphenylene ether resin, 5 wt % to 30 wt % of a bismaleimide resin, and 20 wt % to 45 wt % of a crosslinker. A molecular weight of the liquid rubber ranges from 800 g/mol to 6000 g/mol. An iodine value of the liquid rubber ranges from 30 g/100 g to 60 g/100 g.

10 Claims, No Drawings

LOW-DIELECTRIC RUBBER RESIN MATERIAL AND LOW-DIELECTRIC METAL SUBSTRATE

CROSS-REFERENCE TO RELATED PATENT APPLICATION

This application claims the benefit of priority to Taiwan Patent Application No. 110128258, filed on Aug. 2, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a rubber resin material and a metal substrate, and more particularly to a low-dielectric rubber resin material and a low-dielectric metal substrate.

BACKGROUND OF THE DISCLOSURE

With the development of fifth generation wireless system (5G wireless system), high frequency transmission has undoubtedly become the main development trend in an attempt to meet requirements for 5G wireless system. Accordingly, relevant industries have strived to develop a high frequency substrate material for high frequency transmission (a frequency ranging from 6 GHz to 77 GHz), such that a high frequency substrate can be applied to a base station antenna, a satellite radar, an automotive radar, a wireless communication antenna, or a power amplifier.

The high frequency substrate usually has a low dielectric constant (Dk) and a low dielectric dissipation factor (Df), so as to be used for high frequency transmission. Hereinafter, the dielectric constant and the dielectric dissipation factor are collectively referred to as dielectric properties of the high frequency substrate.

A low-dielectric rubber resin material that is currently available on the market usually contains a certain amount of a liquid rubber. The liquid rubber has a high solubility and has a reactive functional group, so that the low-dielectric rubber resin material can be used as the high frequency substrate material.

However, the liquid rubber cannot be unlimitedly added. When an amount of the liquid rubber is high (higher than 25 wt %), a glass transition temperature (Tg) of the low-dielectric rubber resin material can become lower, and a peeling strength of a metal substrate made from the low-dielectric rubber resin material can become weaker.

Therefore, a resin material and a low-dielectric metal substrate that can be applied in the field of high frequency transmission due to having good dielectric properties, an appropriate glass transition temperature, and a good peeling strength has yet to be provided in the relevant industry.

SUMMARY OF THE DISCLOSURE

In response to the above-referenced technical inadequacies, the present disclosure provides a low-dielectric rubber resin material and a low-dielectric metal substrate.

In one aspect, the present disclosure provides a low-dielectric rubber resin material. The low-dielectric rubber resin material includes a low-dielectric rubber resin composition and inorganic fillers. The low-dielectric rubber resin composition includes 5 wt % to 40 wt % of a liquid rubber, 20 wt % to 70 wt % of a polyphenylene ether resin, 5 wt % to 30 wt % of a bismaleimide resin, and 20 wt % to 45 wt % of a crosslinker. A molecular weight of the liquid rubber ranges from 800 g/mol to 6000 g/mol. An iodine value of the liquid rubber ranges from 30 g/100 g to 60 g/100 g.

In certain embodiments, monomers forming the liquid rubber include a styrene monomer and a butadiene monomer, and based on a total weight of the liquid rubber being 100 wt %, an amount of the styrene monomer ranges from 10 wt % to 50 wt %.

In certain embodiments, based on a total weight of the butadiene monomer being 100 wt %, 30 wt % to 90 wt % of the butadiene monomer has a side chain containing an ethylene group.

In certain embodiments, based on a total weight of the low-dielectric rubber resin composition being 100 phr, an amount of the inorganic fillers ranges from 40 phr to 250 phr.

In certain embodiments, a purity of the inorganic fillers is higher than or equal to 99.95%.

In certain embodiments, an amount of metal impurities in the inorganic fillers is lower than or equal to 500 ppm.

In certain embodiments, an amount of calcium element in the inorganic fillers is lower than or equal to 200 ppm, an amount of aluminum element in the inorganic fillers is lower than or equal to 200 ppm, and an amount of iron element in the inorganic fillers is lower than or equal to 100 ppm.

In another aspect, the present disclosure provides a low-dielectric metal substrate. The low-dielectric metal substrate includes a substrate layer and a metal layer disposed on the substrate layer. The substrate layer is formed from a low-dielectric rubber resin material. The low-dielectric rubber resin material includes a low-dielectric rubber resin composition and inorganic fillers. The low-dielectric rubber resin composition includes 5 wt % to 40 wt % of a liquid rubber, 20 wt % to 70 wt % of a polyphenylene ether resin, 5 wt % to 30 wt % of a bismaleimide resin, and 20 wt % to 45 wt % of a crosslinker. A molecular weight of the liquid rubber ranges from 800 g/mol to 6000 g/mol. An iodine value of the liquid rubber ranges from 30 g/100 g to 60 g/100 g.

In certain embodiments, a peeling strength of the low-dielectric metal substrate ranges from 5.5 lb/in to 7.0 lb/in.

In certain embodiments, the low-dielectric metal substrate has a dielectric constant lower than or equal to 3.5 and a dielectric dissipation factor lower than or equal to 0.002.

Therefore, in the low-dielectric rubber resin material and the low-dielectric metal substrate provided by the present disclosure, by virtue of "a molecular weight of the liquid rubber ranging from 800 g/mol to 6000 g/mol" and "an iodine value of the liquid rubber ranging from 30 g/100 g to 60 g/100 g", the rubber resin material can be used as a high frequency transmission material.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Low-Dielectric Rubber Resin Material]

A low-dielectric rubber resin material (or a rubber resin material for short) of the present disclosure contains a liquid rubber. By controlling properties of the liquid rubber, an amount of the liquid rubber added in the rubber resin material can be higher than an upper limit of the amount of the liquid rubber allowable in the conventional technology. Therefore, the rubber resin material of the present disclosure is more suitable to be used as a high frequency substrate material.

Specifically, the rubber resin material of the present disclosure includes a low-dielectric rubber resin composition (or a rubber resin composition for short) and inorganic fillers. The inorganic fillers are uniformly dispersed in the rubber resin composition. Specific properties of the rubber resin composition and the inorganic fillers will be illustrated below.

[Low-Dielectric Rubber Resin Composition]

The rubber resin composition of the present disclosure includes: 5 wt % to 40 wt % of the liquid rubber, 20 wt % to 70 wt % of a polyphenylene ether resin, 5 wt % to 30 wt % of a bismaleimide resin, and 20 wt % to 45 wt % of a crosslinker.

Through the aforesaid components and contents, the rubber resin composition of the present disclosure can be used to manufacture a low-dielectric metal substrate (or a metal substrate for short) that has good dielectric properties and a good thermal resistance. In addition, the metal substrate can have a strong adhesive force with a metal layer (i.e., having an appropriate peeling strength). Property tests for the metal substrate will be illustrated below.

When the liquid rubber has a molecular weight ranging from 800 g/mol to 6000 g/mol, flowability of the rubber resin composition can be enhanced. Accordingly, a glue filling property of the rubber resin composition can also be enhanced. Preferably, the molecular weight of the liquid rubber ranges from 800 g/mol to 5500 g/mol.

It is worth mentioning that in the present disclosure, an amount of the liquid rubber in the rubber resin composition can be increased due to control of the molecular weight and the iodine value of the liquid rubber. Specifically, based on a total weight of the rubber resin composition being 100 wt %, the amount of the liquid rubber is higher than 25 wt %. In an exemplary embodiment, the rubber resin composition contains 25 wt % to 40 wt % of the liquid rubber.

In certain embodiments, the liquid rubber includes a liquid diene rubber. Specifically, the liquid diene rubber includes a polybutadiene resin. The polybutadiene resin is a polymer polymerized from butadiene monomers, such as a butadiene homopolymer or a copolymer formed from butadiene and other monomers.

In an exemplary embodiment, the liquid diene rubber is a copolymer formed from butadiene and styrene. In other words, monomers forming the liquid rubber include styrene and butadiene. A styrene monomer and a butadiene monomer can be randomly arranged forming a random copolymer, or can be regularly arranged forming an alternating copolymer or a block copolymer.

Based on a total weight of the liquid rubber being 100 wt %, an amount of the styrene monomer ranges from 10 wt % to 50 wt %. When the liquid rubber contains 10 wt % to 50 wt % of the styrene monomer, the adhesive force between the metal substrate and the metal layer (i.e., the peeling strength of the metal substrate) can be enhanced. Preferably, the liquid rubber contains 15 wt % to 50 wt % of the styrene monomer. When the amount of the styrene monomer is higher than 50 wt %, since the styrene monomer has no reactive groups to be crosslinked, a crosslinking degree of the rubber resin material will be decreased, thereby negatively influencing the thermal resistance of the metal substrate.

Specifically, the butadiene monomer has two double bonds. Hence, different ways of polymerizing the butadiene monomer can result in different structures of the polybutadiene resin. In other words, the polybutadiene resin can include one or more structures of: cis-1, 4-polybutadiene, trans-1, 4-polybutadiene, and 1, 2-polybutadiene. When the butadiene is polymerized through a 1, 4-addition reaction, the structure of cis-1, 4-polybutadiene or trans-1, 4-polybutadiene can be formed. In the structure of cis-1, 4-polybutadiene or trans-1, 4-polybutadiene, neither cis-1, 4-polybutadiene nor trans-1, 4-polybutadiene has an unsaturated side chain. When the butadiene is polymerized through a 1, 2-addition reaction, the structure of 1, 2-polybutadiene can be formed. In the structure of 1, 2-polybutadiene, 1, 2-polybutadiene has an unsaturated side chain (such as an ethylene group).

In an exemplary embodiment, based on a total weight of the butadiene monomers being 100 wt %, 30 wt % to 90 wt % of the butadiene monomers (after being polymerized) have a side chain containing an ethylene group. Preferably, based on the total weight of the butadiene monomers being 100 wt %, 30 wt % to 80 wt % of the butadiene monomers (after being polymerized) have the side chain containing an ethylene group.

When the liquid rubber has at least one unsaturated side chain containing an ethylene group (or an ethylene side chain), a crosslinking density and a thermal resistance of the rubber resin composition after being crosslinked can be enhanced. In the present disclosure, an amount of the unsaturated side chain containing an ethylene group (or an ethylene side chain) in the liquid rubber can be quantified by an iodine value through a chemical analysis.

The higher the amount of the unsaturated side chain containing an ethylene group (or an ethylene side chain) is, the higher the iodine value of the liquid rubber is. Physical properties of the rubber resin composition after being crosslinked can be enhanced by the unsaturated side chain containing an ethylene group (or an ethylene side chain). Specific measurements of the iodine value of the liquid rubber will be illustrated below.

In the present disclosure, a molecular weight of the polyphenylene ether resin ranges from 1000 g/mol to 20000 g/mol. Preferably, the molecular weight of the polyphenylene ether resin ranges from 2000 g/mol to 10000 g/mol. More preferably, the molecular weight of the polyphenylene ether resin ranges from 2000 g/mol to 2200 g/mol. When the molecular weight of the polyphenylene ether resin is lower than 20000 g/mol, a solubility of the polyphenylene ether resin in a solvent can be enhanced, which is advantageous for preparing the rubber resin composition.

In an exemplary embodiment, the polyphenylene ether resin can have at least one modified group. The modified group can be selected from the group consisting of: a hydroxyl group, an amino group, an ethylene group, a styrene group, a methacryl group, and an epoxy group. The modified group of the polyphenylene ether resin can provide an unsaturated bond, so as to facilitate a crosslinking reaction. In this way, a material that has a high glass transition temperature and a good thermal resistance can be obtained. In the present embodiment, two molecular ends of the polyphenylene ether resin each have the modified group, and the two modified groups are the same.

In an exemplary embodiment, the polyphenylene ether resin can include one kind of polyphenylene ether or various kinds of polyphenylene ether.

For example, the polyethylene ether can be a polyphenylene ether that has two hydroxyl modified groups at molecular ends thereof, a polyphenylene ether that has two methacryl modified groups at molecular ends thereof, a polyphenylene ether that has two styrene modified groups at molecular ends thereof, or a polyphenylene ether that has two epoxy modified groups at molecular ends thereof. However, the present disclosure is not limited thereto.

In certain embodiments, the polyphenylene ether resin includes a first polyphenylene ether and a second polyphenylene ether. Molecular ends of both the first polyphenylene ether and the second polyphenylene ether each have at least one modified group. The modified group can be selected from the group consisting of: a hydroxyl group, an amino group, an ethylene group, a styrene group, a methacryl group, and an epoxy group. In addition, the modified group of the first polyphenylene ether and the modified group of the second polyphenylene ether can be different from each other. Specifically, a weight ratio of the first polyphenylene ether to the second polyphenylene ether ranges from 0.5 to 1.5. Preferably, the weight ratio of the first polyphenylene ether to the second polyphenylene ether ranges from 0.75 to 1.25. More preferably, the weight ratio of the first polyphenylene ether to the second polyphenylene ether is 1.

For example, the first polyphenylene ether and the second polyphenylene ether can each be one of the polyphenylene ether having two hydroxyl modified groups at the molecular ends thereof, the polyphenylene ether having two methacryl modified groups at the molecular ends thereof, the polyphenylene ether having two styrene modified groups at the molecular ends thereof, and the polyphenylene ether having two epoxy modified groups at the molecular ends thereof. However, the present disclosure is not limited thereto.

In the present disclosure, an average molecular weight of the bismaleimide resin ranges from 500 g/mol to 4500 g/mol. Preferably, the average molecular weight of the bismaleimide resin ranges from 500 g/mol to 3500 g/mol. More preferably, the average molecular weight of the bismaleimide resin ranges from 500 g/mol to 3000 g/mol.

The bismaleimide resin has at least two functional groups, such that the peeling strength of the metal substrate can be enhanced. For example, the bismaleimide resin can be bis(3-ethyl-5-methyl-4- maleimidophenyl)methane (e.g., the model KI-70 produced by KI Chemical Industry Co., LTD. and the model BMI-5100 produced by Daiwakasei Industry Co., LTD.), (4,4'-methylene diphenyl)bismaleimide (e.g., the model BMI-1000, BMI-1000H, BMI-1000S, BMI-1100, or BMI-1100H produced by Daiwakasei Industry Co., LTD.), phenylmaleimide oligomers (e.g., the model BMI-2000 or BMI-2300 produced by Daiwakasei Industry Co., LTD.), m-phenylene bismaleimide (e.g., the model BMI-3000 or BMI-3000H produced by Daiwakasei Industry Co., LTD.), bisphenol A diphenyl ether bismaleimide (e.g., the model BMI-4000 produced by Daiwakasei Industry Co., LTD.), 3,3'-dimethyl-5,5'-diethyl-4,4'-diphenylethane bismaleimide (e.g., the model BMI-5100 produced by Daiwakasei Industry Co., LTD.), (4-methyl-1, 3-phenylene) bismaleimide (e.g., the model BMI-7000 or BMI-7000H produced by Daiwakasei Industry Co., LTD), or 1,6-bismaleimide-(2,2,4-trimethyl)hexane (e.g., the model BMI-TMH produced by Daiwakasei Industry Co., LTD.). However, the present disclosure is not limited thereto.

The crosslinker of the present disclosure can enhance a crosslinking degree of the polyphenylene ether resin and the liquid rubber. In the present embodiment, the crosslinker can include an allyl group. For example, the crosslinker can be triallyl cyanurate (TAC), triallyl isocyanurate (TRIC), diallyl phthalate, divinylbenzene, triallyl trimellitate, or any combination thereof. Preferably, the crosslinker can be triallyl isocyanurate. However, the present disclosure is not limited thereto.

[Inorganic Fillers]

An addition of the inorganic fillers can help decrease a viscosity of the rubber resin material and decrease a dielectric constant of the rubber resin material. For example, the inorganic fillers can be silicon dioxide, titanium dioxide, aluminum hydroxide, aluminum oxide, magnesium hydroxide, magnesium oxide, calcium carbonate, boron oxide, calcium oxide, strontium titanate, barium titanate, calcium titanate, magnesium titanate, boron nitride, aluminum nitride, silicon carbide, cerium oxide, or any combination thereof. However, the present disclosure is not limited thereto.

In an exemplary embodiment, the inorganic fillers include silicon dioxide. The silicon dioxide can be fused silica or crystalline silica. Preferably, the silicon dioxide is fused silica.

An appearance of the inorganic fillers can be spherical. An average particle size of the inorganic fillers ranges from 0.3 μm to 30 μm. The particle size of the inorganic fillers is within a range between 0.3 μm and 30 μm, such that the inorganic fillers can be uniformly dispersed in the rubber resin composition.

In an exemplary embodiment, a purity of the inorganic fillers is higher than or equal to 99.95%. In other words, an amount of metal impurities in the inorganic fillers is lower than or equal to 500 ppm. Specifically, an amount of calcium element in the inorganic fillers is lower than or equal to 200 ppm, an amount of aluminum element in the inorganic fillers is lower than or equal to 200 ppm, and an amount of iron element in the inorganic fillers is lower than or equal to 100 ppm. When the purity of the inorganic fillers is higher than or equal to 99.95%, a dielectric dissipation factor of the metal substrate can be maintained to be lower than or equal to 0.002 (10 GHz). Preferably, the dielectric dissipation factor of the metal substrate is lower than or equal to 0.0018.

An amount of the inorganic fillers can be adjusted according to product requirements. In certain embodiments, based on the total weight of the rubber resin composition being 100 phr, the amount of the inorganic fillers ranges from 30 phr to 250 phr. Preferably, based on the total weight of the rubber resin composition being 100 phr, the amount of the inorganic fillers ranges from 30 phr to 200 phr. More preferably, based on the total weight of the rubber resin composition being 100 phr, the amount of the inorganic fillers ranges from 30 phr to 100 phr. However, the present disclosure is not limited thereto.

[Property Test]

In order to prove that the rubber resin material can be used as the high frequency substrate material, 5 wt % to 40 wt % of the liquid rubber, 20 wt % to 70 wt % of the polyphenylene ether resin, 5 wt % to 30 wt % of the bismaleimide resin, and 20 wt % to 45 wt % of the crosslinker are mixed to form the rubber resin composition. In addition, the inorganic fillers are further added into the rubber resin composition, so as to form the rubber resin material of Examples 1 to 6 and Comparative Examples 1 to 3. Specific contents of the rubber resin material of Examples 1 to 6 and Comparative Examples 1 to 3 are listed in Table 1.

In Table 1, the liquid rubber can be a butadiene/styrene copolymer A, a butadiene/styrene copolymer B, a butadiene/styrene copolymer C, or a butadiene homopolymer. Specific properties of the butadiene/styrene copolymer A, the butadiene/styrene copolymer B, the butadiene/styrene copolymer C, and the butadiene homopolymer are listed in Table 2.

The iodine value of the liquid rubber in each of Examples 1 to 6 and Comparative Examples 1 to 3 is listed in Table 1. In order to measure the iodine value of the liquid rubber, 0.3 mg to 1 mg of the liquid rubber is completely dissolved in chloroform, and is placed in the dark for 30 minutes after a Wijs solution is added thereinto. Next, 20 ml of a potassium iodide solution (100 g/L) and 100 ml of water are added to form an analyte. Subsequently, the analyte is titrated by a sodium thiosulfate solution (0.1 mol/L) which is used as a titrant. When a color of the analyte becomes light yellow, a few drops of a starch solution are dripped into the analyte. Then, the analyte is further titrated until a blue color of the analyte disappears.

In Table 1, the polyphenylene ether resin refers to a polyphenylene ether resin produced by Saudi Basic Industries Corporation (SABIC) as the model SA9000, and the SA9000 polyphenylene ether resin has methacryl groups at two molecular ends thereof. The bismaleimide resin is bis(3-ethyl-5-methyl-4-maleimidphenyl)methane, such as the model KI-70 produced by KI Chemical Industry Co., LTD. or the model BMI-5100 produced by Daiwakasei Industry Co., LTD. The crosslinker is triallyl isocyanurate (TRIC).

In Table 1, three kinds of the inorganic fillers that have different purities are used. The three kinds of the inorganic fillers have 85 ppm, 168 ppm, and 868 ppm of metal impurities, respectively. The metal impurities include the aluminum element, the calcium element, and the iron element.

Subsequently, a glass fiber cloth produced by Nan Ya Plastics Corporation as the model 1078 is immersed into the rubber resin material in each of Examples 1 to 6 and Comparative Examples 1 to 3. After immersion, drying, and molding, a prepreg is obtained. After the prepreg is processed, a metal layer is disposed on the prepreg, so as to form the metal substrate of Examples 1 to 6 and Comparative Examples 1 to 3. Properties of the metal substrate of Examples 1 to 6 and Comparative Examples 1 to 3 are listed in Table 3.

In Table 3, the properties of the metal substrate are measured by methods below.

(1) Dielectric constant (10 GHz): detecting a dielectric constant of the metal substrate at 10 GHz by a dielectric analyzer (model: HP Agilent E5071C).
(2) Dielectric dissipation factor (10 GHz): detecting the dielectric dissipation factor of the metal substrate at 10 GHz by the dielectric analyzer (model: HP Agilent E5071C).
(3) Peeling strength: measuring the peeling strength of the metal substrate according to the IPC-TM-650-2.4.8 test method.
(4) Thermal resistance: heating the metal substrate in an autoclave at a temperature of 120° C. and a pressure of 2 atm for 120 minutes, and then putting the said metal substrate into a soldering furnace of 288° C., so as to record the time needed for delamination.

TABLE 1

| Unit: phr | | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| Rubber resin composition | Liquid rubber | Butadiene/styrene copolymer A | 30 | 30 | 0 | 0 | 10 | 15 | 30 | 0 | 30 |
| | | Butadiene/styrene copolymer B | 0 | 0 | 30 | 0 | 0 | 0 | 0 | 0 | 0 |
| | | Butadiene/styrene copolymer C | 0 | 0 | 0 | 30 | 20 | 15 | 0 | 0 | 0 |
| | | Butadiene homopolymer | 0 | 0 | 0 | 0 | 0 | 0 | 0 | 30 | 0 |
| | | Iodine value (g/100 g) | 38 | 39 | 34 | 36 | 35 | 37 | 28 | 35 | 36 |
| | Polyphenylene ether resin (SA9000) | | 40 | 40 | 40 | 40 | 40 | 40 | 45 | 40 | 40 |
| | Crosslinker (TAIC) | | 20 | 20 | 20 | 20 | 20 | 20 | 25 | 20 | 20 |
| | Bismaleimide resin | KI-70 | 10 | 0 | 10 | 10 | 10 | 10 | 0 | 10 | 10 |
| | | BMI-5100 | 0 | 10 | 0 | 0 | 0 | 0 | 0 | 0 | 0 |

TABLE 1-continued

|  | Unit: phr | Example | | | | | | Comparative Example | | |
| --- | --- | --- | --- | --- | --- | --- | --- | --- | --- | --- |
|  |  | 1 | 2 | 3 | 4 | 5 | 6 | 1 | 2 | 3 |
| Inorganic fillers | Silicon dioxide (impurity: 168 ppm) | 40 | 40 | 40 | 40 | 20 | 40 | 40 | 40 | 0 |
|  | Silicon dioxide (impurity: 85 ppm) | 0 | 0 | 0 | 0 | 20 | 0 | 0 | 0 | 0 |
|  | Silicon dioxide (impurity: 868 ppm) | 0 | 0 | 0 | 0 | 0 | 0 | 0 | 0 | 40 |

TABLE 2

| Liquid rubber | Molecular weight | Amount of styrene monomer | Amount of the butadiene monomers (after being polymerized) having a side chain containing an ethylene group |
| --- | --- | --- | --- |
| Butadiene/styrene copolymer A | 5300 g/mol | 35 wt % | 70 wt % |
| Butadiene/styrene copolymer B | 4500 g/mol | 20 wt % | 70 wt % |
| Butadiene/styrene copolymer C | 3200 g/mol | 28 wt % | 30 wt % |
| Butadiene homopolymer | 3900 g/mol | 0 wt % | 70 wt % |

TABLE 3

|  |  | Example | | | | | | Comparative Example | | |
| --- | --- | --- | --- | --- | --- | --- | --- | --- | --- | --- |
|  |  | 1 | 2 | 3 | 4 | 5 | 6 | 1 | 2 | 3 |
| Metal substrate | Dielectric constant (10 GHz) | 3.39 | 3.28 | 3.28 | 3.31 | 3.30 | 3.22 | 3.28 | 3.31 | 3.48 |
|  | Dielectric dissipation factor (10 GHz) × $10^3$ | 1.6 | 1.7 | 1.7 | 1.7 | 1.6 | 1.6 | 1.8 | 1.7 | 2.5 |
|  | Peeling strength (lb/in) | 6.2 | 6.1 | 6.3 | 6.5 | 6.6 | 6.5 | 4.3 | 4.5 | 6.2 |
|  | Thermal resistance | OK | OK | OK | OK | OK | OK | OK | OK | OK |

According to results in Table 1 and Table 3, by controlling contents of the liquid rubber, the polyphenylene ether resin, the bismaleimide resin, and the crosslinker, the metal substrate of Examples 1 to 6 can have good dielectric properties, a good peeling strength, and a good thermal resistance. Even when the rubber resin composition contains a high content (higher than 25 wt %) of the liquid rubber, the metal substrate of the present disclosure can still have a good peeling strength.

Specifically, in the present disclosure, the iodine value of the liquid rubber ranges from 30 g/100 g to 60 g/100 g. Preferably, the iodine value of the liquid rubber ranges from 30 g/100 g to 50 g/100 g. More preferably, the iodine value of the liquid rubber ranges from 30 g/100 g to 40 g/100 g.

Specifically, in the present disclosure, the dielectric constant (10 GHz) of the metal substrate is lower than or equal to 3.5. Preferably, the dielectric constant (10 GHz) of the metal substrate ranges from 2.5 to 3.5. More preferably, the dielectric constant (10 GHz) of the metal substrate ranges from 3.0 to 3.5. The dielectric dissipation factor (10 GHz) of the metal substrate is lower than or equal to 0.002. Preferably, the dielectric dissipation factor (10 GHz) of the metal substrate is lower than or equal to 0.0018. More preferably, the dielectric dissipation factor (10 GHz) of the metal substrate is lower than or equal to 0.0017. The peeling strength of the metal substrate ranges from 5.5 lb/in to 7 lb/in. Preferably, the peeling strength of the metal substrate ranges from 6 lb/in to 7 lb/in.

According to Comparative Examples 1 and 2, when the bismaleimide resin is absent from the rubber resin composition (Comparative Example 1) or the styrene monomer is absent from the liquid rubber (Comparative Example 2), the reactivity of the rubber resin composition is decreased, thereby negatively influencing the peeling strength of the metal substrate. In Comparative Example 1, the rubber resin composition does not contain the bismaleimide resin, which causes the metal substrate to have a low peeling strength. In Comparative Example 2, the liquid rubber only contains the butadiene homopolymer (RICON® 150) and does not contain the styrene monomer, thereby causing the peeling strength of the metal substrate to be low.

An addition of the silicon dioxide can not only enhance the dielectric constant of the metal substrate but can also influence the dielectric dissipation factor of the metal substrate. According to Comparative Example 3, when the amount of the metal impurities in the inorganic fillers is higher than 500 ppm, the dielectric dissipation factor of the metal substrate is increased due to the metal impurities. Accordingly, the rubber resin material is not suitable to be used as a high frequency transmission material.

[Beneficial Effects of the Embodiments]

In conclusion, in the low-dielectric rubber resin material and the low-dielectric metal substrate provided by the present disclosure, by virtue of "a molecular weight of the liquid rubber ranging from 800 g/mol to 6000 g/mol" and "an iodine value of the liquid rubber ranging from 30 g/100 g to 60 g/100 g", the rubber resin material can be used as the high frequency transmission material.

Further, by virtue of "adding the bismaleimide resin" and "monomers forming the liquid rubber including a styrene monomer", the peeling strength of the metal substrate can be enhanced.

Moreover, by virtue of "a purity of the inorganic fillers being higher than or equal to 99.95%" and "an amount of metal impurities in the inorganic fillers being lower than or equal to 500 ppm", the dielectric dissipation factor of the metal substrate can be decreased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A low-dielectric rubber resin material, comprising a low-dielectric rubber resin composition and inorganic fillers, wherein the low-dielectric rubber resin composition includes:
   30 wt % to 40 wt % of a liquid rubber, wherein a molecular weight of the liquid rubber ranges from 800 g/mol to 6000 g/mol, and an iodine value of the liquid rubber ranges from 30 g/100 g to 60 g/100 g;
   20 wt % to 40 wt % of a polyphenylene ether resin;
   5 wt % to 10 wt % of a bismaleimide resin; and
   20 wt % to 45 wt % of a crosslinker;
   wherein a substrate layer formed from the low dielectric rubber resin material has a dielectric constant measured at 10 GHz that is lower than or equal to 3.5.

2. The low-dielectric rubber resin material according to claim 1, wherein monomers forming the liquid rubber include a styrene monomer and a butadiene monomer, and based on a total weight of the liquid rubber being 100 wt %, an amount of the styrene monomer ranges from 10 wt % to 50 wt %.

3. The low-dielectric rubber resin material according to claim 2, wherein, based on a total weight of the butadiene monomer being 100 wt %, 30 wt % to 90 wt % of the butadiene monomer has a side chain containing an ethylene group.

4. The low-dielectric rubber resin material according to claim 1, wherein, based on a total weight of the low-dielectric rubber resin composition being 100 phr, an amount of the inorganic fillers ranges from 40 phr to 250 phr.

5. The low-dielectric rubber resin material according to claim 1, wherein a purity of the inorganic fillers is higher than or equal to 99.95%.

6. The low-dielectric rubber resin material according to claim 5, wherein an amount of metal impurities in the inorganic fillers is lower than or equal to 500 ppm.

7. The low-dielectric rubber resin material according to claim 6, wherein an amount of calcium element in the inorganic fillers is lower than or equal to 200 ppm, an amount of aluminum element in the inorganic fillers is lower than or equal to 200 ppm, and an amount of iron element in the inorganic fillers is lower than or equal to 100 ppm.

8. A low-dielectric metal substrate, comprising a substrate layer and a metal layer disposed on the substrate layer, wherein the substrate layer is formed from a low-dielectric rubber resin material, the low-dielectric rubber resin material includes a low-dielectric rubber resin composition and inorganic fillers, and the low-dielectric rubber resin composition includes:
   30 wt % to 40 wt % of a liquid rubber, wherein a molecular weight of the liquid rubber ranges from 800 g/mol to 6000 g/mol, and an iodine value of the liquid rubber ranges from 30 g/100 g to 60 g/100 g;
   20 wt % to 40 wt % of a polyphenylene ether resin;
   5 wt % to 10 wt % of a bismaleimide resin; and
   20 wt % to 45 wt % of a crosslinker;
   wherein the substrate layer has a dielectric constant measured at 10 GHz that is lower than or equal to 3.5.

9. The low-dielectric metal substrate according to claim 8, wherein a peeling strength of the low-dielectric metal substrate ranges from 5.5 lb/in to 7.0 lb/in.

10. The low-dielectric metal substrate according to claim 8, wherein the low-dielectric metal substrate has a dielectric dissipation factor measured at 10 GHz that is lower than or equal to 0.002.

* * * * *